United States Patent [19]

Guimbretiere

[11] 4,352,528

[45] Oct. 5, 1982

[54] ROLLING BEARING HAVING TWO ROWS OF ROLLING ELEMENTS AND DEVICE FOR MOUNTING A VEHICLE WHEEL

[75] Inventor: Pierre L. Guimbretiere, Neauphle le Chateau, France

[73] Assignee: Glaenzer Spicer, Poissy, France

[21] Appl. No.: 126,114

[22] Filed: Feb. 29, 1980

[30] Foreign Application Priority Data

Apr. 24, 1979 [FR] France ................................. 79 10351

[51] Int. Cl.³ ........................ F16C 19/08; F16C 33/58
[52] U.S. Cl. .............................. 308/189 R; 308/236; 180/258; 301/6 R
[58] Field of Search .............. 308/16, 190, 191, 178, 308/189 R, 208, 210, 211, 236; 301/6 R, 6 D, 126, 135; 180/253, 254, 258, 259

[56] References Cited

U.S. PATENT DOCUMENTS

| 2,711,936 | 6/1955 | Rhine | 308/211 |
|---|---|---|---|
| 4,026,610 | 5/1977 | Neder et al. | 308/236 |
| 4,026,614 | 5/1977 | Neder | 308/189 R |
| 4,046,433 | 9/1977 | Kiener | 308/191 |
| 4,047,770 | 9/1977 | Korehof et al. | 308/191 |
| 4,094,376 | 6/1978 | Welschof | 308/191 |

FOREIGN PATENT DOCUMENTS 2505081  8/1976  Fed. Rep. of Germany ...... 308/191

Primary Examiner—Richard R. Stearns
Attorney, Agent, or Firm—Schuyler, Banner, Birch, McKie & Beckett

[57] ABSTRACT

A device for mounting a vehicle wheel having a hub on a support has a roller bearing comprising two rows of rolling elements and an inner unit defining raceways for the rolling elements and defining at least one end face provided with frontal radiating splines, this unit consisting of a single ring which is axially clamped between two faces, of which one face is associated with the support and the other face pertains to the wheel hub splines being provided on the face of the hub which fit and engage these splines on the single ring.

3 Claims, 3 Drawing Figures

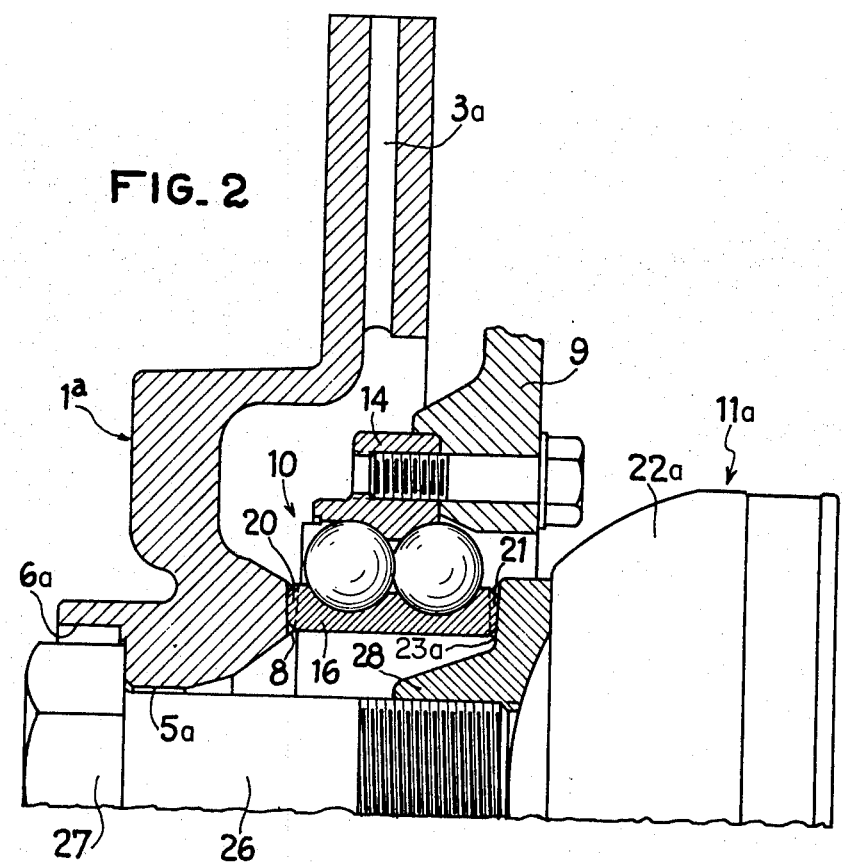
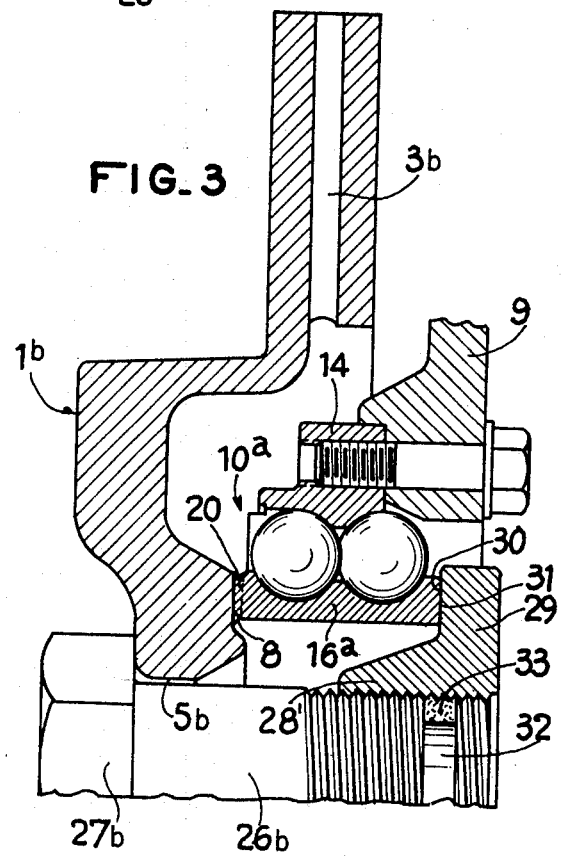

ROLLING BEARING HAVING TWO ROWS OF ROLLING ELEMENTS AND DEVICE FOR MOUNTING A VEHICLE WHEEL

The present invention relates to rolling bearings having two rows of rolling elements in which the inner assembly of the rolling bearing has on at least one end face front radiating splines, and it more particularly concerns devices for mounting vehicle wheels employing these rolling bearings.

U.S. Pat. No. 3,586,357 discloses, among other things, rolling bearings of this type which have many advantages, in particular for the mounting of vehicle wheels. In these rolling bearings, the inner assembly of the rolling bearing is formed by two juxtaposed rings each of which carries a raceway. The face of each ring adjacent to the other ring must then also be provided with centering means which are preferably capable of transmitting a driving torque, for example splines.

The object of the invention is to provide a more simple, lighter and cheaper arrangement. Thus the invention provides a rolling bearing of the aforementioned type wherein the inner bearing assembly is formed by a single ring.

Another object of the invention is to provide a device for mounting a vehicle wheel which comprises a rolling bearing such as that define hereinbefore whose inner ring is axially clamped between two faces, one of which pertains to the wheel hub, conjugate splines being provided at least on the adjacent surfaces of the ring and hub.

Further features and advantages of the invention will be apparent from the ensuing description which is given merely by way of example with reference to the accompanying drawings in which:

FIG. 2 is a similar half view of a modification of the mounting device of FIG. 1;

FIG. 3 is a half view similar to FIG. 2 of another mounting device according to the invention.

Figure 1:
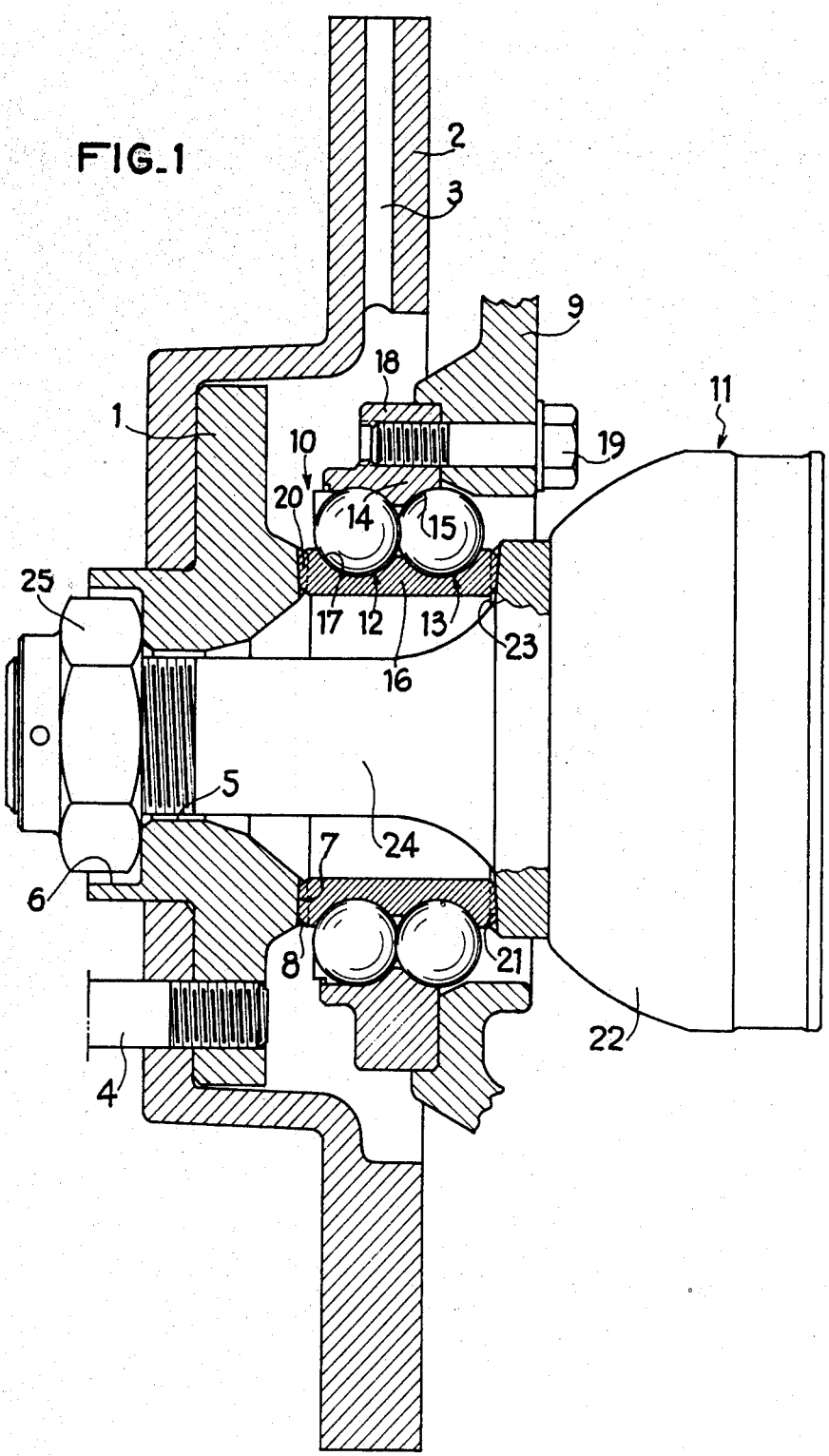
FIG. 1 is a partial axial sectional view of a wheel mounting device according to the invention.

FIG. 1 shows the hub 1 of a front driving wheel of an automobile vehicle. Fixed on this hub is a brake disc 2 comprising radial cooling passageways 3. The web of the wheel (not shown) is adapted to be fixed to this assembly by screws 4.

The hub 1 has a smooth bore 5 which is counterbored at 6 on the outside. On the inside, it terminates in an annular face 7 throughout the periphery of which radiating splines 8 are formed.

The wheel is mounted in the wheel pivot 9 by means of a ball bearing 10 and driven in rotation through a homokinetic joint 11.

More precisely, the bearing 10 comprises two rows or rings of balls 12, 13 which are trapped between an outer ring 14 defining two raceways 15 and a single inner ring 16 defining two raceways 17. The two rows of balls slightly interpenetrate and the contacts between the balls and raceways are oblique. The bearing also has a ball retaining cage (not shown) and suitable sealing devices (not shown).

The outer ring 14 is provided with a radial flange 18 for fixing it to the wheel pivot 9 by means of screws 19. The radial dimension of the inner ring 16 is of the same order as that of the face 7 of the hub 1. Formed on the entire periphery of each end face of this ring are radiating splines 20, 21.

Likewise, the outer face of the driven element 22 of the homokinetic joint 11, which is for example a bowl-shaped element of a tripod joint, is annular and provided with radiating splines 23 throughout its periphery.

The splines 20 and 21 of the ring 16 are respectively conjugate to the splines 8 and 23 and engage the latter in the manner described in the aforementioned U.S. Pat. No. 3,586,357. All the splines are formed by a simple cold stamping operation. In the illustrated embodiment, they are slightly conical.

Extending out of the joint 11 is an axial shaft 24 which is rigid therewith. This shaft freely extends through the ring 16 of the bearing and the bore 5 of the hub. Screwed on the screwthreaded end portion of this shaft is a clamping nut 25 which is received in the counterbore 6 and bears against the inner end of the latter. When the nut 25 is tightened, the ring 16 is axially clamped between the hub 1 and the element 22 of the joint 11. The pairs of splines 8–20 and 21–23 ensure a perfect centering of the ring 16 relative to these two elements and a transmission without play to the wheel of the driving torque applied to the joint 11.

The arrangement of FIG. 1 has all the advantages of that described in the aforementioned patent. Moreover, it is simpler to produce, mount and disassemble, smaller in overall size, lighter and cheaper.

The mounting device of FIG. 2 is similar to that of FIG. 1, with simply the following two differences: the hub and the brake disc constitute a single element 1a having cooling passageways 3a, smooth bore 5a and counterbore 6a. Further, the shaft 24 and the nut 25 of FIG. 1 are replaced by a screw 26 of the same diameter as the shaft 24 whose hexagonal head 27 is received in the counterbore 6a and bears against the inner end of the latter. The screw 26 is screwed into the tapped hole of an axial extension 28 of the element 22a of the joint 11a, this hole opening into the cavity of the element 22a. The operation and advantages of this modification are the same as in the case of FIG. 1.

FIG. 3 illustrates the application of the device of FIG. 2 to the mounting of a non-driving vehicle wheel. In this case, the homokinetic joint 11 of FIGS. 1 and 2 no longer exists. The axial extension 28' pertains to a clamping flange 29 which has a planar annular outer surface 30. This surface 30 is applied against the inner face 31 of the inner ring 16a of the bearing 10a which is also planar and devoid of splines. Thus, the ring 16a of the bearing 10a has a single splined face, namely that facing outwardly. The pairs of splines 8–20 are indeed sufficient to ensure the perfect centering of the hub 16a. The end of the screw 26b opposite hexagonal head 27b has a circular groove 32 in which a sealing element 33 is disposed.

Having now described my invention what I claim as new and desire to secure by Letters Patent is:

1. A device for mounting on a support a vehicle wheel which has a hub, said device comprising a rolling bearing comprising two rows of rolling elements and an inner unit defining raceways for the rolling elements and defining at least one end face provided with frontal radiating splines, said unit consisting of a single ring which is axially clamped between two faces, of which one face is associated with the support and the other face pertains to the wheel hub, splines being provided on the face of the hub which fit and engage said splines on the single ring.

2. A device as claimed in claim 1, wherein said ring has frontal radiating splines on two end faces and said support is part of a homokinetic joint driving the wheel and is provided with splines which fit and engage the splines on said ring.

3. A device as claimed in claim 1, wherein an opposite end face of said ring is smooth and a clamping ring engages said opposite end face of said ring.

* * * * *